United States Patent [19]
Akachi

[11] 3,726,075
[45] Apr. 10, 1973

[54] VARIABLE PITCH-TYPE CABLE CORE TWISTER

[75] Inventor: Hisateru Akachi, Kanagawa-ken, Japan

[73] Assignee: Oki Densen Kabushiki Kaisha, Kanagawa-ken, Japan

[22] Filed: Mar. 18, 1971

[21] Appl. No.: 125,630

[30] Foreign Application Priority Data

Apr. 7, 1970 Japan..............................45/30023

[52] U.S. Cl...........................................57/59, 57/64
[51] Int. Cl..............................................D07b 3/02
[58] Field of Search...................................
  57/13–15, 59, 60, 64, 62, 58.3–58.38, 58.52

[56] References Cited

UNITED STATES PATENTS

| | | | |
|---|---|---|---|
| 2,353,432 | 7/1944 | Arrington | 57/59 X |
| 2,412,196 | 12/1946 | Ashbauch et al. | 57/59 |
| 2,365,661 | 12/1944 | Winslow | 57/59 X |
| 2,371,939 | 3/1945 | Winslow | 57/59 |
| 2,676,452 | 4/1954 | Cook | 57/58.38 |
| 2,703,958 | 3/1955 | DeHalleux | 57/58.36 |

*Primary Examiner*—John Petrakes
*Attorney*—Kelman & Berman

[57] ABSTRACT

A variable pitch-type cable core twister comprising a frame, a reel rotatably supported in said frame and having a supply roll of core elements wound thereon, a core element paying-out flyer fixedly mounted on a shaft rotatably supported in said frame for rotational movement relative to said reel to pay said core elements out of said reel, a brake or tensioning flyer fixedly mounted on a separate shaft rotatably supported in said frame for rotational movement relative to said reel and paying-out flyer and having a plurality of guide holes through which said core elements pass in separated relationship while being braked thereby, a core element twisting-together die fixedly mounted in said frame for twisting the core elements together to form a quad while the core elements are passing through the guide, and drive means for said reel, paying-out flyer and brake flyer.

4 Claims, 2 Drawing Figures

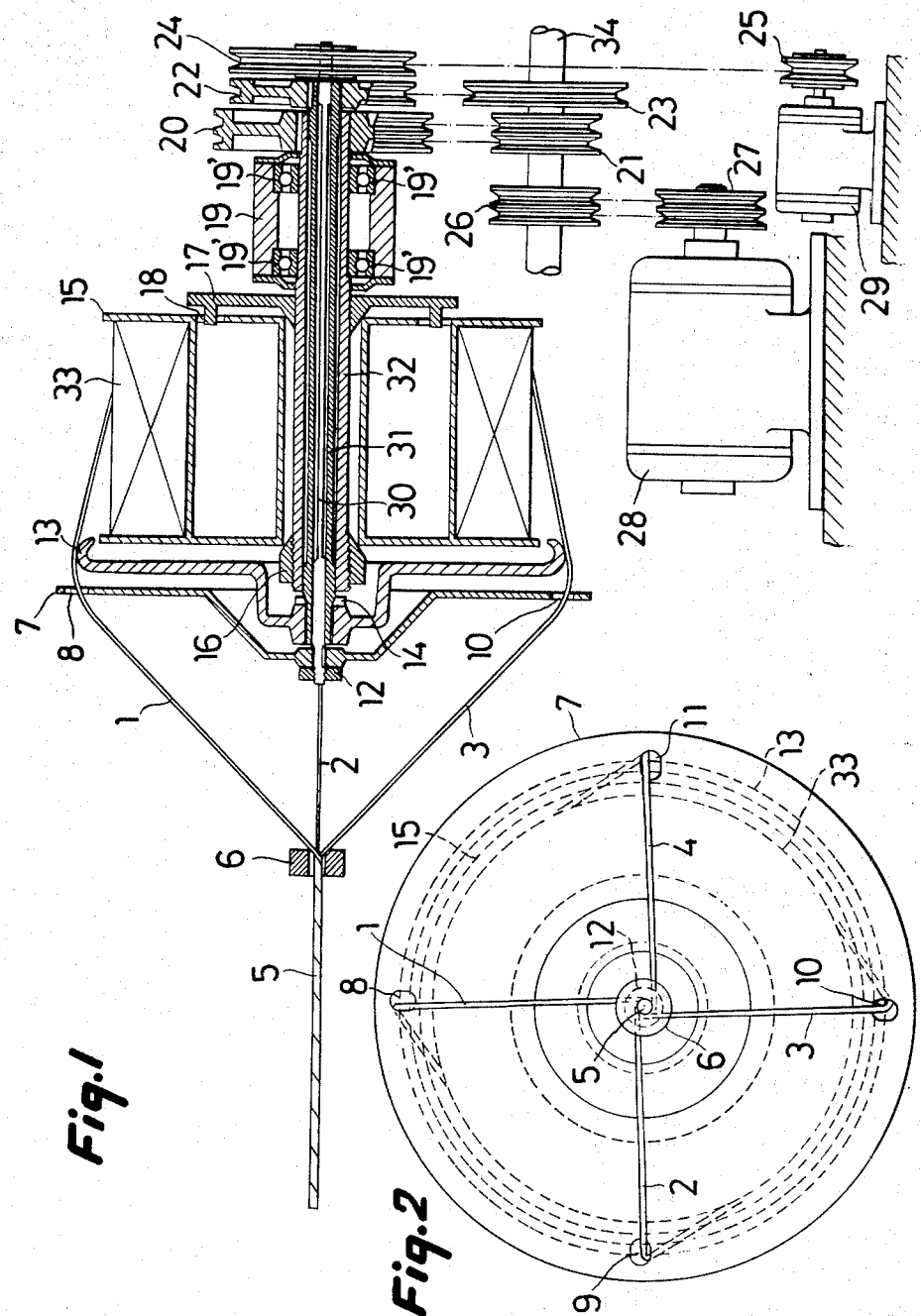

VARIABLE PITCH-TYPE CABLE CORE TWISTER

This invention relates to a variable pitch-type cable core twister. There are, of late, increasing demands for conductors or cable cores for communication having diameters as small as 0.5 mm, 0.4 mm and even 0.32 mm. Although known twisters and methods for producing communication cable cores employing such twisters are so designed that cable core elements can be satisfactorily twisted together without being subjected to any excessively high external or adverse force, it has been found that prudent caution must be taken in practically operating such twisters for producing such small diameter cable cores as referred to above.

SUMMARY OF THE INVENTION

Therefore, one important object of the present invention is to provide a novel and improved variable pitch-type cable core twister which is especially suitable for producing cable cores of small diameters for communication at high production rates employing reels having relatively large load capacities and sizes.

In order to wind a conductive cable core element of 0.5 mm diameter onto a reel in a known cable core twister to the length of 1,000 m, the reel must have flanges each having a diameter of 400 mm, for example. On the other hand, in the twister of the invention, when it is desired to wind three separate cable core elements each having a diameter of 0.5mm onto a reel in parallel relationship to the length of 30,000 m each, for example, such a reel must have flanges 800 mm in diameter. When the three parallel cable core elements are to be rotated at a high speed while being payed out of the large reel in a plane extending from and in line with the axis of the reel shaft in a cable core twister employing the conventional linear paying-out flyer, there is the possibility that the core elements are excessively stretched and/or the core elements are sheared off at the time of actuation and/or stoppage of the twister.

Therefore, the present invention is to provide a variable pitch-type cable core twister which can effectively perform a twisting operation while eliminating the difficulties encountered in the known cable core twisters referred to above.

The above and other objects and attendant advantages of the present invention will be more readily apparent to those skilled in the art from a reading of the following detailed description in conjunction with the accompanying drawings which show a preferred form of the invention for illustration purpose only, but not for limiting the scope of the same in any way.

BRIEF DESCRIPTION OF THE DRAWING

FIG. 1 is an elevational sectional view of a cable core twister according to the present invention; and FIG. 2 is an end elevational view of said twister as seen from the left-hand side of FIG. 1.

PREFERRED EMBODIMENT OF THE INVENTION

The reference numerals 1, 2, 3 and 4 denote individual elements for a cable core in the form of conductors and these elements are supplied from a supply roll 33 in which the core elements are disposed in parallel to each other and which is wound on the drum of a reel 15. The core elements 1, 2, 3 and 4 are of the same diameter and substantially the same length. As the reel 15 is rotated in the manner described hereinbelow, the core elements are payed out of the reel and pass through a stationary die 6 supported in the frame of the twister (not shown) in a position forwardly of the reel 15 to form a quad 5. Reference numeral 7 denotes a brake or tensioning flyer which is provided with four guide openings 8, 9, 10 and 11 in an equiangularly spaced relationship around the periphery of the flyer for initially arranging the separate cable core 33 into two pairs of symmetrical arrays with respect to the center of the flyer 7 and then guiding the elements therethrough until they are twisted together. The brake flyer further serves to impart a predetermined braking action on the rotation of the core elements as they pass to the die 6. The brake flyer 7 has a shaft 30 which is slidably received within the longitudinal opening of the hollow shaft 31 of the paying-out flyer 13 and the shaft 31 is in turn slidably received within the longitudinal opening of the hollow shaft 32 of the reel 15. These shafts are rotatably supported at (the right-hand end as seen in FIG. 1) by means of suitable bearings 19' in a common bracket 19 which is a portion of the machine frame (not otherwise shown).

The right hand ends of the shafts 30, 31 and 32 extend beyond the bracket 19 and respectively carry a double-grooved V-sheave 20, a single-grooved sheave 22, and a single-grooved V-sheave 24. The shaft 32 and reel 15 are connected to each other by means of a nut 16 and an arm 17 which engages an opening 18 provided in the drum of the reel.

A double-grooved V sheave 21 is fixedly mounted on an intermediate shaft 34 disposed parallel to and spaced from the shafts 30, 31 and 32 in driving connection with the associated sheave 20 by means of endless belts (shown by chain lines). The intermediate shaft 34 also supports a single-grooved V sheave 23 which is in driving connection with the associated sheave 22 by means of an endless belt. Also supported on the intermediate shaft 34 is a double-grooved V-sheave 26 connected to the output shaft of a main electric motor 28 by a double-grooved V-sheave 27 and endless belts.

When the quad 5 is taken up onto a suitable take-up means (not shown) at a fixed linear speed as the quad issues from the die 6, the core elements are payed out of the reel while rotating at a speed depending upon the linear taking-up speed of the quad 5 and the ever-decreasing diameter of the roll of the core elements on the drum of the reel. In such a case, the core elements rotate in a forward or reverse direction with respect to the rotation of the reel 15 depending upon the manner in which the inner ends of the core elements are secured to the drum of the reel or the direction in which the core elements are wound on the reel drum. The rotational speed of the core elements relative to the rotational speed of the reel 15 increases in proportion to the reduction in diameter of the roll of the core elements on the reel drum. The transmission ratio between the sheaves 20 and 21 and between the sheaves 23 and 22, respectively, is so selected that the paying-out flyer rotates in the same direction as the core elements and at a higher speed than the maximum rotational speed of the core elements relative to the reel. In FIGS. 1 and 2, the core elements are shown as rotating in the same direction as the reel and the rotational speed of the paying-out flyer is higher than that of the reel.

When the core elements rotate opposite to the reel, the rotational speed of the paying-out flyer should be lower than that of the reel and the diameter ratios between the sheaves 20 and 21 and between the sheaves 22 and 23, respectively, should be reversed as compared to those shown in the illustrated embodiment.

A V-sheave 25 is fixedly mounted on the output shaft of a smaller torque motor 29 and in driving connection with the sheave 24 by means of an endless belt. When the torque of the motor is transmitted through the sheave 25, belt and sheave 24 to the paying-out flyer 13 the torque motor serves to impart a predetermined torque to the individual core elements to brake the rotational movement of the core elements about their own axes. If desired, the torque motor can be replaced by an electromagnetic brake or a simple mechanical brake. However, when the individual core elements are designed to rotate about their own axes in the opposite direction to that of the reel, it is essential that the illustrated torque motor be employed for imparting torque to the core elements in the direction of rotation of the reel. Reference numeral 12 and 14 denote set nuts which hold the shaft 30 of the brake flyer 7 and the shaft 31 of the paying flyer 13 in position, respectively.

With the above construction and arrangement of the component parts of the variable pitch-type cable core twister of the invention, description will be now made of the manner in which the twisting pitch varies and rotation modes of the reel, core element paying-out flyer and brake flyer when the twister is practically operated.

Initial diameter of the core element roll of the reel — 500 mm

Final diameter of the core element roll of the reel — 300 mm

Rotational speed of the reel and the output shaft of the main electric motor — 2000 r.p.m.

Linear taking-up speed of the quad — 200 m/min.

1. Assuming that the individual core elements rotate about their own axes in the same direction as the reel or the number of twists in the core elements is to be increased, then the rotational movement of the core elements about their own axes will vary in different stages in a cycle of operation as follows:

Initial stage $N_1 = \frac{200 \times 1000}{500\pi} - \frac{400}{\pi} = 127$ r.p.m.

Terminal stage $N_2 = \frac{200 \times 1000}{300\pi} - \frac{200 \times 334}{\pi} = 212$ r.p.m.

Twisting pitch in initial stage $P_1 = \frac{200 \times 1000}{2000 + 127} = 94$ mm.

Twisting pitch in terminal stage $P_2$
$$= \frac{200 \times 1000}{2000 + 212} = 91 \text{ mm.}$$

The rotational speed for the paying-out flyer necessary for complying with the above-given factors will be:

$$N_3 \geqq 2,212 \text{ r.p.m.}$$

The rotational speed of the brake flyer necessary for complying with the above-give factors will be:
Initial stage $N_4 = 2127$ r.p.m.
Terminal stage $N_5 = 2212$ r.p.m.
and the brake torque is applied opposite to the rotational direction of the reel.

2. Assuming that the individual core elements rotate about their own axes in the opposite direction to that of the reel or the number of twists in the core elements is to be reduced, then the rotational movement of the core elements about their own axes will vary in different stages in a cycle of operation as follows:

Initial stage $$N_1 = 127 \text{ r.p.m.}$$

Twisting pitch in initial stage $$P_1 = \frac{200 \times 1000}{2000 - 127} = 107 \text{ mm.}$$

Twisting pitch in terminal stage $$P_2 = \frac{200 \times 1000}{2000 - 212} = 117 \text{ mm.}$$

The rotational speed of the core element paying-out flyer necessary for complying with the above-given factors will be:

$$N_3 \leqq 1,788 \text{ r.p.m.}$$

The rotational speed of the brake flyer necessary for complying with the above-given factors will be:
Initial stage $N_4 = 1873$ r.p.m.
Terminal stage $N_5 = 1788$ r.p.m.
and the brake torque is applied in the same direction as the reel rotation.

Now detailed description will be made of the operative effects of the core element paying-out and brake flyers hereinbelow.

Since the above-mentioned relationship has been established between the rotational speed of the reel, that of the core element paying-out flyer, that of the brake flyer and the linear taking-up speed of the quad according to the present invention, the operative effects of the twister of the invention at the time of actuation, at the time of stoppage of operation, and during normal rotational movement will be analyzed as follows:

a. Actuation:

Upon the actuation of the twister, the reel and core element paying-out flyer are first rotated. In such a case, the flyer rotates at a fixed ratio to the rotational speed of the reel and in the direction in which the core elements are relaxed. The diameter ratio between the sheaves associated with the reel and flyer in so selected that the rotational speed of the flyer can be always maintained at a value equal to or in excess of the rotational speed of the core elements about their own axes in response to the movement of the quad as the latter is taken up at a predetermined linear speed. Therefore, the frictional force generated between the core elements and the rounded edge portion of the paying-out flyer as the core elements are payed out of the reel will impart a turning effect upon the core elements in the relaxing direction adjacent the left-hand reel flange as seen in FIG. 1. The core elements can be imparted a sufficient turning effort merely by being contacted by the rounded edge portion of the flyer and therefore, the core elements will be free of any adverse effects which may be otherwise inevitable.

b. Stopping of Operation:

As the core elements rotate about their own axes, the elements slacken to untwist by a length corresponding to the diameter of the twists in the core elements. In such a case, there will be no frictional force present between the edge portion of the paying-out flyer and the core elements whereby the core elements can be smoothly payed out of the reel without encountering any resistance.

When it is desired to stop the operation of the twister, the rotation of the paying-out flyer and reel are first halted. The brake flyer continues to be imparted a torque thereto in the same direction as the twisting direction of the elements so that the core elements are maintained taut to prevent them from slackening. The torque imparted to the brake flyer in turn tensions the core elements so as to urge the core elements against the rounded edge portion of the paying-out flyer under a suitable pressure ready for actuation of the twister.

c. Normal Rotation:

As the twister continues to operate under normal conditions the brake flyer is always under a predetermined torque, and if the core elements become slackened such slackening can be immediately absorbed. Furthermore, even after the core elements have been maintained taut under an abnormal tension for a relatively prolonged time period, such tension in the elements will be immediately alleviated by being converted into a corresponding paying out force in the same manner as described in connection with the actuation of the twister.

Thus, according to the present invention, the variable pitch-type cable core twister can be efficiently operated at high speeds under all conditions without applying any excessive external force to the core elements and can be effectively and satisfactorily employed in conjunction with reels having large load capacities and smaller drum diameters than those of the conventional twisters.

In the foregoing, description has been made of an instance in which a communication quad having a relatively small diameter is produced, but the twister of the invention can be equally employed for producing two-ply and three-ply cores for communication cables and also for producing cores for other types of cables.

The principle of the invention is also applicable to cable core twisters other than variable pitch-type twisters.

While a specific embodiment of the invention has been shown and described in detail it will be understood that the same is for illustration purpose only and is not to be taken as a definition of the invention and that various modifications and changes will be evident to those skilled in the art without departing and from the scope of the invention as defined in the appended claims.

What is claimed is:

1. Apparatus for twisting a plurality of cable elements into a cable unit comprising, in combination:
   a. a reel mounted for rotation about an axis, said reel having two axially spaced radial flanges and being adapted to have said elements wound thereon intermediate said flanges;
   b. a paying-out flyer mounted for rotation about said axis and axially juxaposed to one of said flanges,
      1. said flyer having an outer circumferential edge portion of substantially greater diameter than said one flange;
   c. first drive means for rotating said reel and said flyer at different speeds about said axis;
   d. guide means for unwinding said elements from said reel and for passing the unwound elements over said edge portion in sliding contact therewith,
      1. said guide means including a tensioning flyer mounted for rotation about said axis and axially offset from said paying-out flyer in a direction away from said reel, said tensioning flyer being formed with a plurality of circumferentially distributed axial apertures radially adjacent said edge portion for passage therethrough of said unwound elements respectively;
   e. second drive means for rotating said tensioning flyer about said axis relative to said paying-out flyer and said reel; and;
   f. a stationary die member apertured for receiving the cable elements having passed said apertures and axially spaced from said tensioning flyer in a direction away from said paying-out flyer.

2. Apparatus as set forth in claim 1, wherein said first drive means include two hollow shafts rotatable about said axis, one of said shafts being received in the other shaft, said shafts respectively being fastened to said reel and to said paying-out flyer, and transmission means having a single input member connected to two output members on said shafts respectively, and said second drive means including a third shaft coaxially received in the inner one of said two shafts.

3. Apparatus as set forth in claim 2, wherein said reel is fixedly fastened to the outer one of two shafts, 4. Apparatus as set forth in claim 1, wherein said edge portion is rounded.

* * * * *